(12) United States Patent
Adjaoute

(10) Patent No.: US 10,671,915 B2
(45) Date of Patent: *Jun. 2, 2020

(54) METHOD FOR CALLING FOR PREEMPTIVE MAINTENANCE AND FOR EQUIPMENT FAILURE PREVENTION

(71) Applicant: Brighterion, Inc., San Francisco, CA (US)

(72) Inventor: Akli Adjaoute, Mill Valley, CA (US)

(73) Assignee: Brighterion, Inc., Purchase, NY (US)

( * ) Notice: Subject to any disclaimer, the term of this patent is extended or adjusted under 35 U.S.C. 154(b) by 138 days.

This patent is subject to a terminal disclaimer.

(21) Appl. No.: 14/815,940

(22) Filed: Jul. 31, 2015

(65) Prior Publication Data

US 2015/0339586 A1 Nov. 26, 2015

Related U.S. Application Data

(63) Continuation-in-part of application No. 14/815,848, filed on Jul. 31, 2015, now abandoned.

(51) Int. Cl.
*G06Q 40/00* (2012.01)
*G06N 3/08* (2006.01)
*G05B 23/02* (2006.01)
*G06N 20/00* (2019.01)

(52) U.S. Cl.
CPC .......... *G06N 3/08* (2013.01); *G05B 23/0229* (2013.01); *G06N 20/00* (2019.01)

(58) Field of Classification Search
CPC ....................................................... G06Q 40/00
USPC ............................................... 705/35, 39, 34
See application file for complete search history.

(56) References Cited

U.S. PATENT DOCUMENTS

2010/0191634 A1* 7/2010 Macy ................. G06Q 30/0202
705/35

* cited by examiner

*Primary Examiner* — Ojo O Oyebisi
(74) *Attorney, Agent, or Firm* — Hovey Williams LLP

(57) ABSTRACT

A method for operating digital electronic appliance that empanels several different artificial intelligence (AI) classification technologies into a "jury" uses combinational digital logic to render "verdicts" about the need for service and impending equipment failures of the machines they monitor. Networks can be used to forward signals from remote locations to a centralized appliance that may be plugged as a module into a server. The appliance outputs can also be communicated over networks to servers that will muster appropriate maintenance personnel who are forewarned as to the nature of the trouble.

16 Claims, 4 Drawing Sheets

METHOD FOR CALLING FOR PREEMPTIVE MAINTENANCE AND FOR EQUIPMENT FAILURE PREVENTION

BACKGROUND OF THE INVENTION

Field of the Invention

The present invention relates to methods for protecting groups of digital electronic appliances used collectively for monitoring the operation of machines and for issuing predictions, warnings and calls for preventative maintenance and equipment failure interventions, and more particularly to methods that use computer data processing systems to empanel several artificial intelligence (AI) classification technologies into a "jury" that renders "verdicts" about the need for service and impending equipment failures.

Background

Digital signal processors (DSP) implemented as specialized semiconductor intellectual property (SIP) cores have circuit architectures that have been optimized for the operational needs of digital signal processing. DSP's are used to measure, filter and/or compress continuous real-world analog signals. Many general-purpose microprocessors can also execute digital signal processing algorithms successfully, but dedicated DSP's usually have better power efficiency thus they are more suitable in portable devices such as mobile phones because of power consumption constraints. DSP's frequently use special memory architectures that are able to fetch multiple data and/or instructions at the same time.

Xilinx defines Field Programmable Gate Arrays (FPGA's) as semiconductor devices that are based around a matrix of configurable logic blocks (CLB's) connected via programmable interconnects. FPGA's can be reprogrammed to desired application or functionality requirements after manufacturing. This feature distinguishes FPGA's from Application Specific Integrated Circuits (ASIC's), which are custom manufactured for specific design tasks. Although one-time programmable (OTP) FPGA's are available, the dominant types today are based on static random access memory (SRAM) which can be reprogrammed circuit by circuit as the design evolves.

ASIC's and FPGA's have different value propositions, and so the choices must be evaluated. FPGA's once were selected for their lower speed/complexity/volume designs. But modern FPGA's now push the so-called 500-MHz performance barrier and are benefiting from logic density increases, embedded processors, DSP blocks, clocking, and high-speed serial, at ever lower price points.

Another is to employ a general purpose computer with its inputs, outputs, and processing specially adapted to operate in the device environment and to execute its programming in the ways described herein. Such may be the most flexible way to implement these embodiments, but the costs to do so may be excessive, especially if only a small portion of the computer's capabilities and resources are employed.

SUMMARY OF THE INVENTION

Briefly, digital electronic appliance embodiments of the present invention empanel several different artificial intelligence (AI) classification technologies into a "jury" that uses combinational digital logic to render "verdicts" about the need for service and impending equipment failures of the machines they monitor. Networks can be used to forward signals from remote locations to a centralized appliance that may be plugged as a module into a server. Or, the appliance outputs can be communicated over networks to servers that will muster appropriate maintenance personnel who are forewarned as to the nature of the trouble.

The above and still further objects, features, and advantages of the present invention will become apparent upon consideration of the following detailed description of specific embodiments thereof, especially when taken in conjunction with the accompanying drawings.

DETAILED DESCRIPTION OF THE INVENTION

Figure 1:
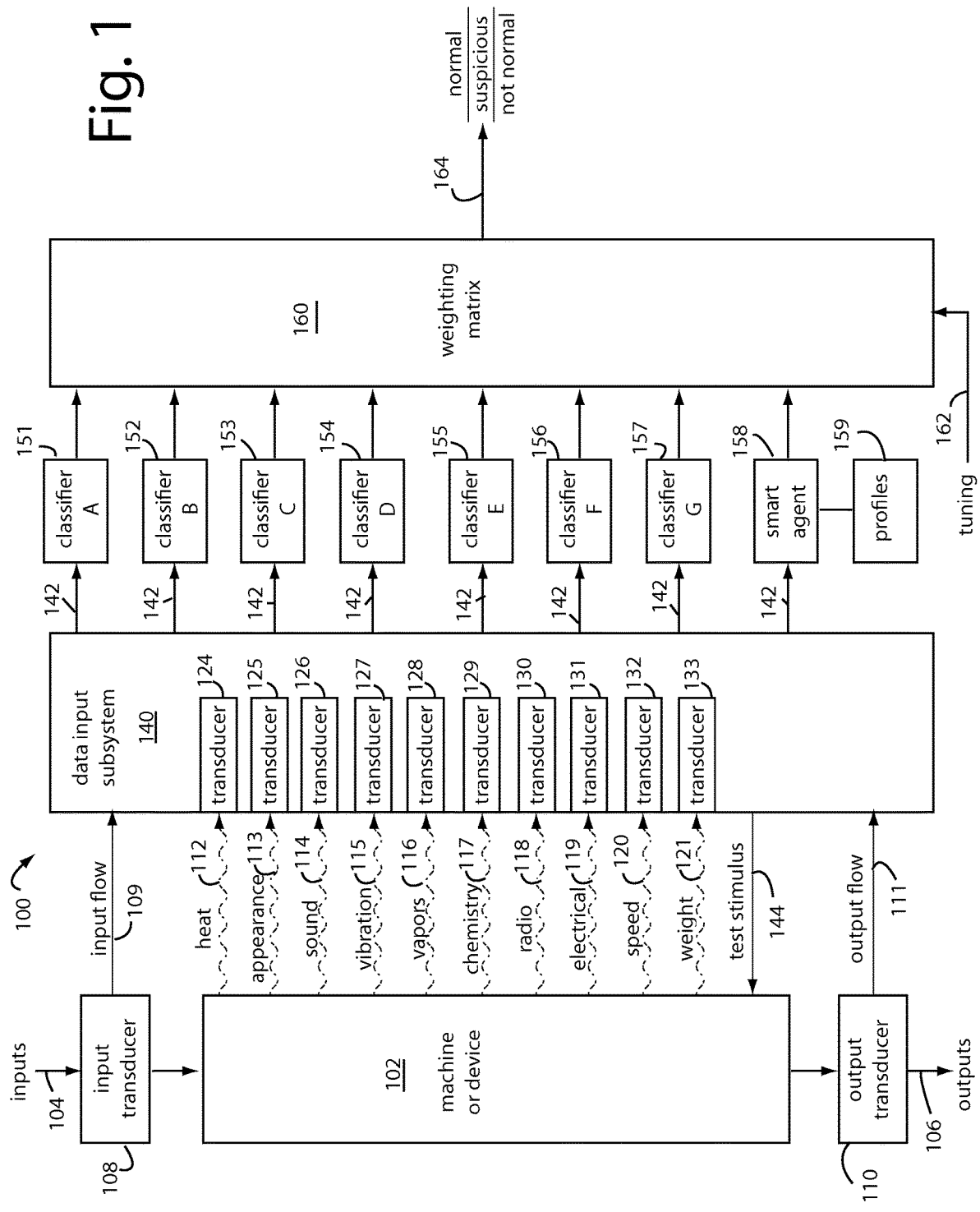
FIG. 1 is functional block diagram an appliance for monitoring a machine and for predicting and reporting its need for service or the probability of an imminent failure.

FIG. 1 represents a group of electronic appliances for monitoring the operation of machines or devices, and for issuing predictions, warnings and calls for preventative maintenance and equipment failures, all in an embodiment of the present invention, and such is referred to herein by the general reference numeral 100. Monitoring appliance 100 is attached to a machine 102 that uses inputs 104 to produce outputs 106. For example, if machine 102 were a diesel electric generator, the primary inputs 104 would be diesel fuel and the primary output 106 would be electrical power, e.g., 440 VAC three phase. Secondary inputs 104 could be motor oil for lubrication and water for cooling. Secondary outputs 106 could be a battery charging 24 VCD output, a local 110 VAC utility for lighting.

Machine 102 could be anything from a washing machine, to an automobile, to a utility power station, to a computer mainframe, to a heating furnace, to a ship, to a network server. These would be "things" in the emerging Internet of Things.

Monitoring appliance 100 uses transducers to continuously measure various parameters associated with machine 102. In the example of FIG. 1, an input transducer 108 provides an electrical signal 109 in proportion to some input flow, e.g., 4-20 milliamps to represent 0-10 milliliters per minute or 0-100 liters of diesel per hour. An output transducer 110 provides an electrical signal 111 in proportion to some output flow, e.g., 4-20 ma to represent 0-1000 volts or 0-100 kilowatt hours.

Typical equipment, like machine 102, will produce indirect, inadvertent, or consequential symptoms, clues, noise, emissions, evidence, and other outputs 112-121 that can be measured and monitored by various types of corresponding transducers 124-133, as in Table I.

TABLE

| parameter | transducer | measurement units |
|---|---|---|
| heat | 124 | temperature |
| appearance | 125 | video |
| sound | 126 | audio |
| vibration | 127 | accelerometer |
| vapors | 128 | smoke, carbon monoxide |
| chemistry | 129 | pH acidity |
| radio | 130 | radio/magnetic emissions |
| electrical | 131 | electrical noise |
| speed | 132 | RPM, MPH, % of rated |
| weight | 133 | pounds, kilograms, mass |

Experienced troubleshooters who become familiar with other devices like machine 102 will, over time, get to know the symptoms of an impending failure or an already developed one. Or when service is really needed, as opposed to a scheduled time coming near. This experience can be "canned" for use by automation and artificial intelligence.

Internal combustion engines are well known to produce rattles, vibrations, and unusual noises when something has gone wrong. Cars too produce symptoms like loss of power, hard starting, excessive fuel consumption, gas bubbles in the coolant, high operating temperatures, dead batteries, taillight malfunctions, etc. Very often one component will trigger problems with or damage to other components.

A data input subsystem 140 monitors and reports the many readings, measurements, and information collected from transducers 108, 110, and 124-133. The products of the transducers will generally produce expected values within the specifications of machine 102. Each individual machine 102 will settle on some variations from average or mean values that become its norms. Different kinds of devices 102 will express different suites of parameters, and not every or all parameters will be harbingers that can be useful in these embodiments. Those represented here are just typical. Some parameters can be computed from one or more of the measured parameters, e.g., totalized hours of operation, or efficiency like miles per gallon.

The measured and computed attributes of machine 102 are numerous and can be used to render a "picture" of machine 102 each instant and "movies" over spans of time. These attributes are collected and distributed into parallel attribute sets 142, wherein each set 142 repeats all the same attributes derived from all the transducers.

Sometimes it is necessary to apply a test or a combination of test stimulus 144 to the machine 102 to get it to respond in a certain or helpful way that can be observed and analyzed. For example, a test stimulus 144 could be controls to do a hard reset, or a stop/start cycle.

In the virtual world of a computer, the parallel attribute sets 142 replace the actual physical machine 102 and act as abstractions of it. If the parallel attribute sets 142 are comprehensive, then a complete "picture" can be had. In one sense, the actual physical machine 102 becomes completely intangible. The parallel attribute sets 142 dissolve into digital or analog values that data processing systems can manipulate and analyze. Machine 102 abstracts a virtual "entity" that is fully represented by its attributes.

A parallel panel or "jury" of classification engines (A-G) 151-157 each apply different techniques and methods to analyze, interpret, and scrutinize identical parallel attribute sets 142. The objective is to get a variety of perspectives using a variety of classical classification technologies to "decide" if the inputs they see are normal or not. Here, the present combination existing at the instant on the inputs is assigned by each classification engine (A-G) 151-157 to one of several categories.

The input data for any classification task is a collection of records. Each record, instance, for example, is characterized by a tuple (x,y), where x is the attribute set and y is a special attribute, designated as the class label, category or target attribute. For example, vertebrates can be classified into mammals, birds, fish, reptiles, and amphibians. The attribute set includes properties and abilities. The attribute sets can be continuous. The class label, in contrast, must be a discrete attribute. This is a key characteristic that distinguishes classification from regression, where y is a continuous attribute in a predictive modeling task.

A smart agent 158 receives the same inputs as classification engines (A-G) 151-157, but runs a number of short-term, long-term, and recursive profiles 159 to characterize what is routine and what seems to be an excursion from average operations.

A weighting matrix 160 acts as a judge presiding over the jury. Except here, the weighting matrix 160 can give more or less weight to each "vote" produced by a classification engine (A-G) 151-157 and smart agent 158. A courtroom judge is not allowed to disassemble the verdict of a courtroom jury. Here, weighting matrix 160 receives tuning inputs 162 in the form of a priori information, e.g., experience, training, memory, skills, events, extraneous data, news, or business directives to influence which classification engines (A-G) 151-157 are to be given more credence. The consequence of all this is to output a finding or "judgment" 164, e.g., normal, suspicious, or not normal. In the case of a preventative maintenance application, nominal, service needed by part X for reason Y, or imminent failure or outright failure due to W.

Figure 2:
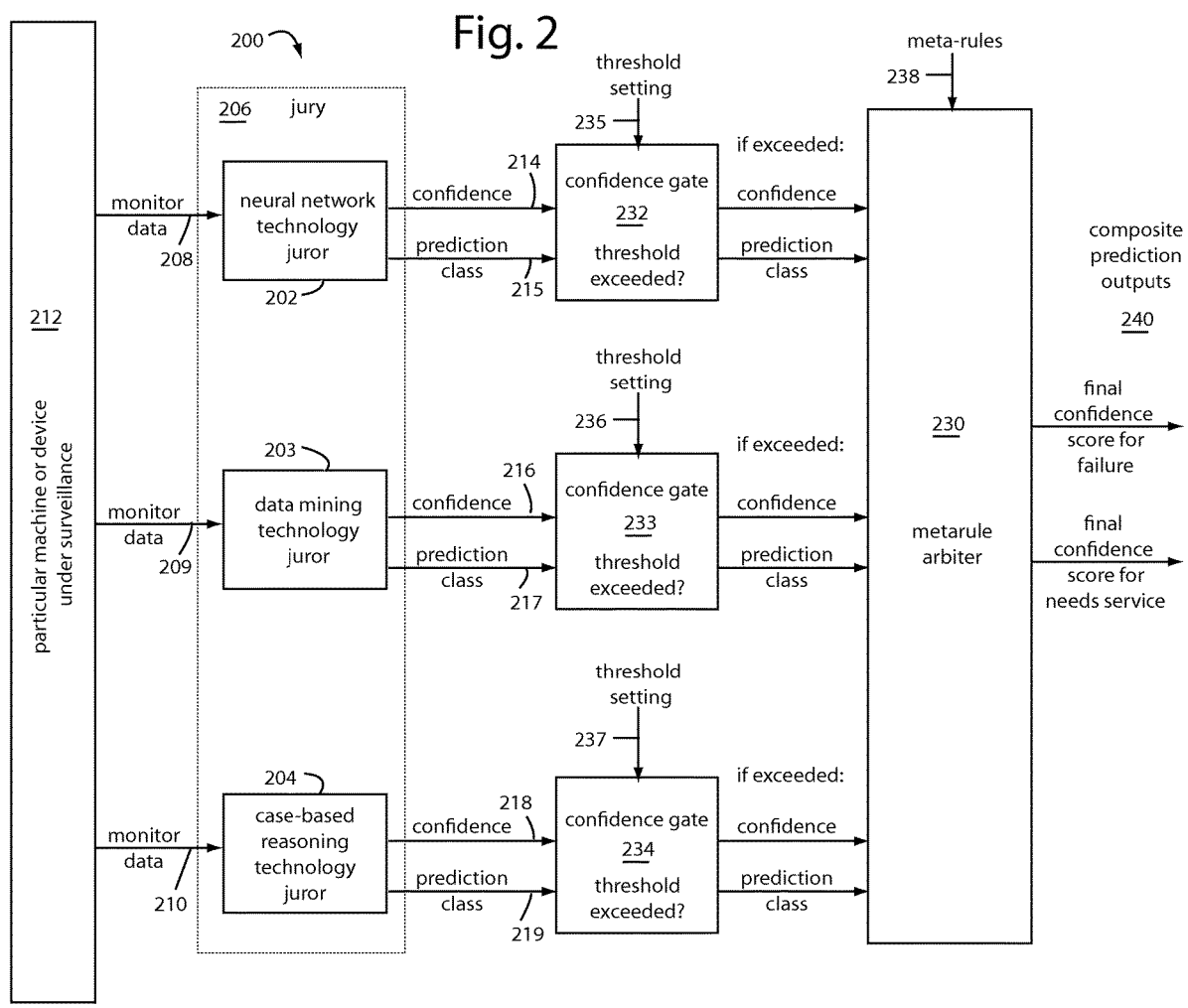
FIG. 2 is functional block diagram of a variety of classification technologies arranged as "jurors" in a jury panel to receive the same evidence from a machine, but then use their own respective talents and hardwiring to arrive at independent decisions output as "votes"

FIG. 2 represents a machine assembly 200 in which a variety of classification technologies 202-204 are, conceptually speaking, arranged as "jurors" in a jury panel 206 to receive the same monitor data (evidence) 208-210 from a machine 212. Much like jurors in a courtroom jury. Each juror 202-204 then each juror uses their own respective talents and hardwiring to arrive at independent decisions output as "votes" 214-219. But in this jury, the "verdict" the jurors deliver are a prediction 215, 216, and 218, e.g., "failure" or "needs service", and how confident the prediction is, e.g., in a confidence score 215, 217, and 219, for example, ranging 0.00 to 1.00.

The development and construction of jurors and jury panels is more fully disclosed in our co-pending application, U.S. patent application Ser. No. 14/815,848 filed Jul. 31, 2015, AUTOMATION TOOL DEVELOPMENT METHOD FOR BUILDING COMPUTER FRAUD MANAGEMENT APPLICATIONS. Such is incorporated by reference herein, in full.

Many different classifier technologies and models have been developed by artificial intelligence experts over the years. Conventionally, classification models have been implemented as data structures or programs in data processing systems that define parameters for their algorithms and control how the corresponding classification model will use its inputs to classify a transaction, event, or parallel attribute set. Here, we use application specific digital logic to do the same thing, only less expensively, more quickly, and more distally distributed. The classifications can be simple, e.g., good/bad and represented by digital logic bits, 1/0. Or they can be a little more informative like in fraud detection and payment authorization systems, e.g., approved/suspicious/ declined, for example with a binary coded decimal on four bit lines, 0-0FH in hexadecimal notation.

Each type of traditional classification model is known to excel in different circumstances and therefore has different uses, e.g., neural networks, decision trees, genetic algorithms, etc. It may not always be known which is going to do well in any given situation, but time and experience with them will reveal the facts. As a juror in a jury panel, and as a result of its hardwiring, each juror has a different perspective, talents, education, training, experience, expectation, external pressures, etc. It will become evident that some jurors in the jury are better readers of the evidence, and a metarule arbiter 230 is wired to prefer or favor particular jurors 202-204.

Individual "votes" 214-219 can be ignored in confidence gates 232-234 if their respective confidences fall below some threshold 235-237. Each confidence value is independently determined by confidence gates 232-234.

So, jurors 202-204 will attach their own confidence in a particular vote they output, and the metarule arbiter 230 can decide for itself if and how much reliance should be placed on each juror 202-204. The metarule arbiter 230 is able to completely overrule the entire jury 206, much the same way a trial judge can enter a "judgment notwithstanding the verdict" (JNOV, non obstante veredicto) in court. A metarules input setting 238 would be used to influence the findings.

Embodiments of the present invention use combinational digital logic circuits to compose composite prediction outputs 240. The multiple artificial intelligence technologies embedded and including our particular smart-agents with real-time and long-term profiling, data mining, neural networks, business rules, fuzzy logic, case-based reasoning, etc. Each technology independently returns its own predictions, confidence scores, and reason details. In general, neural networks cannot be asked about their predictions and their scores.

Final scores are asserted proportional to the health of the equipment, and comments like "service required now" and a computed likelihood of future failures. Otherwise, the equipment/device has no issue.

A variety of digital devices can be used to calculate a final score.

Flag settings in ordered rules are used to indicate how best to process each technology's predictions into a composite conclusion. For example, a first rule for a neural network technology is given a threshold of 0.75. A second rule for a data mining technology is given a threshold of 0.7. A third rule for a case-based reasoning technology is given a threshold of 0.8. These initial threshold settings often are the results of experience or testing.

| GIVEN FLAG SETTINGS | | |
|---|---|---|
| prediction type | classifier AI technology | assigned threshold |
| all | neural network | 0.75 |
| all | data mining | 0.7 |
| all | case-based-reasoning | 0.8 |

In one illustration, these three technologies provide a real-time set of predictions in parallel of 0.7, 0.8. and 0.4, respectively, for a particular machine or device under surveillance.

| EXAMPLE PREDICTIONS | | |
|---|---|---|
| prediction class | classifier AI technology | instant confidence |
| failure | neural network | 0.7 |
| failure | data mining | 0.8 |
| service needed | case-based-reasoning | 0.4 |

In the example, a first rule looks at the neural network technology's confidence of 0.7 and sees that in this instance the confidence is below the given threshold of 0.75, so this is dismissed and the next prediction is considered. A second rule looks at a data mining technology's confidence of 0.8 and sees that in this instance it is above the given threshold of 0.7, so this prediction is flagged to be incorporated in a composite output prediction. A third rule looks at the case-based-reasoning technology's confidence of 0.4 and sees that in this instance the confidence is below the given threshold of 0.8, and so this one too is dismissed and any next predictions are considered.

It is also possible with the prediction class to associate a first higher threshold for future failure predictions, and a second lower threshold that triggers a call for equipment service or maintenance.

A winner-take-all method is used to group individual predictions by classes. Each technology has its own weights, e.g., the one used when to predict a "risk of failure", another one used to predict a "need for service". All such similar predictions are grouped together by summing their weighted confidences. The sum of the weighted confidences is then divided by the sum of the weights used in order to obtain a final confidence score, e.g., ranging between 0.00 and 1.00.

Consider the following example:

| WEIGHTS | | |
|---|---|---|
| classifier AI technology | weight: failure | weight: need service |
| neural network | 2 | 2 |
| data mining | 1 | 1 |
| case-based-reasoning | 2 | 2 |

| PREDICTIONS | | |
|---|---|---|
| prediction class | classifier AI technology | instant confidence |
| failure | neural network | 0.7 |
| failure | data mining | 0.8 |
| service needed | case-based-reasoning | 0.4 |

In this example, two technologies are predicting a failure, so their cumulated weighted confidence is: 2*0.7+1*0.8, or 2.2. Only one technology is predicting "needs service", so its weighted confidence is simply, 1*0.4, or 0.4. Since "2.2" is greater than "0.4", the final score is scored as a risk of failure. The confidence is then normalized by dividing it by the sum of the weights that where associated with failure (2 and 1), so the final confidence is 2.2/(2+1), or 0.73.

It is possible to create models that can predict more than "risk of failure" or "needing service" categories. Business rules can be written to combine the final scores of the several technologies.

Each business rule comprises the name of rule, and its conditions like "if the data mining confidence is greater than 75% then . . . ". Conclusions are written like " . . . then there is a risk of failure with a confidence of 80%". The kinds of "final score rules" that can be written depend on the application and the experts available. In an example 1, "if data mining confidence is greater than 75%, and the equipment contains dangerous products, then . . . ". In an example 2, "if the data mining prediction is risk of failure, and the case-based reasoning prediction is "service needed" then . . . ".

Testing the models allows their tuning. For example, if during a testing phase of a predictive model for data mining scores the class «Service», with low number of errors, then a high weight is assigned to the service class for data mining. But if the neural networks do not correctly predict when service was needed, a lower weight is assigned for the service class compared to the neural networks.

Each of the several technologies can have a weight used to predict "risk of failure", and a different weight to predict "service required". More than these two classes of "risk of failure" and "service required" are possible.

This is more than one way to implement and embody the present invention into digital electronics hardware. A first is a completely custom circuit design with the circuits executed in a silicon integrated circuit, e.g., in a so-called Application Specific Integrated Circuit (ASIC). Another is to employ a field-programmable gate array (FPGA) in which optional circuits are more or less permanently wired together by the irreversible destruction of fuses or anti-fuses.

A "smart agent" by our definition is a data structure prearranged within a computer memory to epitomize an entity or thing in all its essentials by the entity's attributes, history, and behaviors that are manifest, e.g., from specifications, programming, sensors, and transaction data. Each smart agent allows an electronic rendering of the entity or thing it is consigned to in several different and selectable dimensions. Each smart agent can be equipped with "action items" or a "job description" that boils down into clocking a series of steps in a finite state machine (FSM), given various conditions being present in its data, sensors, programming, or other data solicited from other smart agents. Such finite state machine can issue output signals and triggers in each step to other smart agents. The computer processor resources necessary to support such functionality are specially adapted to read/write the data structures in memory, run the finite state machines, provide the inputs, and generate the outputs. In the field, such computer processor resources can be a shared mobile device, an embedded microcomputer, or batch processor. A typical smartphone today represents all the sensor, processing, and communications hardware a typical smart agent would need.

A smart agent can exist at some central location pooled with hundreds, thousands, or even millions of others that receive transaction records reporting the remote activities of the corresponding participants each is assigned to follow. For example, inside a network server they can interoperate and intercommunicate fairly freely and efficiently.

In the Internet-of-Things, the hundreds, thousands, or even millions of participants can be widely dispersed and are each assigned and equipped with a smart agent that is able to communicate with the others. Nowadays, that communication would rely on a wireless technology like WiFi, Bluetooth, NFC, GSM, 4G, etc. Some wireless technologies can breach long distances, others have the advantage of needing to be proximate or very close. That may help secure access to authorized (local) users in a very simple way hard to subvert.

Participants and entities in general are describable by their attributes. Even in widely diverse groups. In one sense, such participants and entities are nothing more than the sum of their attributes. Groups too. And attributes too are describable by their attributes. For example, if one attribute of an entity with a smart agent attached was the color blue, then a smart agent for "blue" could have as its attributes all the users who have the attribute blue. Another attribute could be a paint manufacturer's paint formula code for the blue. Accessing the blue smart agent would get you links immediately to every other smart agent describing itself as blue.

Attributes can be independently variable, fixed, or programmable. The operational status (on/off) of a device can be an independent variable reportable as an attribute. As are ambient temperature, noise, vibration, load, voltage, fuel level, service age. The model and serial number of a device can be a fixed attribute, as are assigned location, color, weight, specifications. A programmable attribute can be like start/stop, accelerate/decelerate, inflate/deflate, heat/cool.

Not all attributes need to be communicated. It may be safe or reasonable to assume or interpolate. For example, to limit communications bandwidth demands.

A piece of machinery can be a "thing" in the Internet-of-Things. Such could be equipped with appropriate sensors to measure ambient noise, temperature, load, output, energy consumption, vibration, etc. Measured and logged over time these attributes will usually fall into some routine or normal pattern of behavior. Smart agent profiles can be used to store and characterize what is normal for its "thing". Deviations from such normalcy can spell trouble, warn of impending failure, call for maintenance, signal intrusion, etc. The smart agent itself can be designed to take some kind of action, e.g., by communicating a "check machine" warning.

For a car, a location attribute would be an independent variable requiring a sensor like a GPS receiver. But for a utility power transformer, the location would normally be fixed. It could however be programmable, as in the case where a new utility power transformer is located in a warehouse inventory, then assigned to be installed on a utility pole, or has been removed to a hazardous waste site to have its toxic oil reserves removed. In this later case, the smart agent could be implemented within the utility power transformer, but would be better in a virtual location that always had power and communications to stay alive. Like an on-line dossier file.

The "thing" smart agents can comprise attributes that have corresponding "attribute" smart agents among 121-127. Discovering or broadcasting to all "thing" smart agents that share a particular attribute would be immediately and directly accessible and quantifiable by the particular "attribute" smart agent 121-127 within server 128. For example, if the attribute were "MasterCard", then all credit card entities or things 101-105 with that attribute would be immediately accessible. In another example, if the attribute were "California AKW 887", then any automobile thing 101-105 with that license plate attribute would be immediately accessible and available to be queried to report its GPS location.

Text Mining is used, for example, to extract maintenance personnel notes from complex machinery equipment maintenance logs. Such logs assemble comments about equipment component failures and associated repairs. Text mining and unsupervised text clustering excerpt information summarizing the actions and components addressed to a particular machine and its operating cycles, maintenance schedules, periodic breakdowns, and to identify abnormal failure rates, triggers and alerts.

Text Mining in general is an automated process of extracting some previously unknown information from analysis of unstructured texts. Text Mining looks to be similar to Data Mining, but there are substantial differences. Data mining uses pattern-extraction of databases. Text Mining crawls over natural language texts. Text-mining differs also from web-searching where the information being searched already exists. In Text Mining, machines extract something new from an already available resource. Fuzzy logic can be applied to text-mining, e.g., for document clustering into pre-specified clusters. Documents can be classified into categories, such as relevant and irrelevant. In a first step, documents are cleaned of advertisements and tags. Hyphens are eliminated and stop words are removed. Word stemming is used to represent words by their roots. Each document can then be represented as an assembly of words. Weights are assigned to words on the basis of their respective significance in the document, e.g., frequency of occurrence.

Word frequency can be calculated as:

$$WF = (\text{Word Count}/(\text{Total Words in the Document})) \times 10000;$$

where, "m" is the number of words are chosen and each document is represented as a set of "m" values which are the WF values of those corresponding "m" words in that document.

Fuzzy Logic and text-mining can be used to cluster similar documents together. Document Clustering is used by a machine to group documents into meaningful groups, e.g., using c-means algorithm. Such algorithm comprises two types, Hard c-means and Fuzzy c-means (FCM). Hard c-means algorithms cluster "m" observations into "c" clusters. Each cluster has a cluster center. Each observation fits into the least distant cluster. Each observation is strictly clustered into a single cluster. FCM is a variation of the hard c-means clustering algorithm. Every observation has a membership value associated with each of the clusters which is inversely related to the distance of the observation from the center of the cluster.

FCM can cluster documents into a required number of categories. A priori information is used to fix these clusters.

Unsupervised Clustering groups data instances together in groups based on their similarities. Clustering is a process of organizing member into groups that are similar in some respect. A similarity is measured by a distance related to an attribute value. Each cluster is dissimilar to the members in other clusters. Clustering algorithms are usefully applied in marketing to find groups of customers with similar buying behaviors and other attributes that can be reported and followed.

Given a set of N items susceptible to being clustered, and an N*N distance (or similarity) matrix, the basic process of hierarchical clustering involves:

1. Assigning each item to its own cluster, such that for N items, there are N clusters, each with just one item;
2. A series of attempts are made to pair each cluster with other clusters, and to merge each candidate into the one cluster. Fuzzy logic can be used to calculate the degree of membership of each item in other clusters;
3. An attribute value that represents the common values of the members of each cluster is changed; and
4. Steps 2-3 are repeated until the minimum number of clusters desired has been assembled.

Association learning is used to discover relevant associations and dependencies between entities and within an entity's behavior. It is useful for identifying connections among elements, communication habits, and hidden relationships. Associative learning is used in marketing, in fraud prevention, and Failure Prevention. For example, a loss of cooling in a machine can cause damage to several other components that will need to be targeted in a maintenance directive.

The dependencies and what always goes together can be learned by one entity given a long time, or by many entities in parallel, e.g., warm weather means more ice cream will be sold. Analyzing billions of transactions during long periods (months, years) with data processing systems can discover things that are impossible for humans to see directly.

The digital logic table-lookup implementation of a decision tree can be realized with a programmable read only memory (PROM) device. The input variables are connected to the address bit inputs of the PROM. One binary variable each to each address bit. The memory locations that they address in combination are programmed with bits that represent the decision tree's decision for each input combination.

Case-based reasoning can similarly be implemented with digital logic devices. For example, with content-addressable-memory (CAM). Cases, really sets of input conditions, can be matched with previous cases that were solved. The solutions are encoded into the CAM locations addressed.

Neural networks are implementable in digital logic devices. For example, an FPGA implementation of a multilayer perceptron neural network was presented by D. Ferrer and published in Design, Automation and Test in Europe Conference and Exhibition, 2004. Proceedings (Volume: 3). The system is parameterized both in network related aspects, e.g., number of layers and number of neurons in each layer, and implementation parameters, e.g., word width, pre-scaling factors and number of available multipliers). This allows the design to be used in many different network realizations, or to try different area-speed trade-offs simply by recompiling the design. Fixed-point arithmetic with pre-scaling configurable in a per layer basis was used. The system was tested on an Altera ARC-PCI board. Several examples from different application domains were implemented showing the flexibility and ease of use of the obtained circuit. Even with the rather old board used, an appreciable speed-up was said to be obtained compared with a software-only implementation based on MATLAB neural network toolbox.

Smart agents can be implemented with digital logic devices. This especially makes sense when one smart agent is paired with one machine out-in-the-wild. And even more so if the machines are mass produced and participate in the emerging Internet-of-Things (IoT). E.g., an application specific integrated circuit (ASIC) having embedded writeable non-volatile memory to store real-time, long-term, and recursive profile information.

Figure 3:
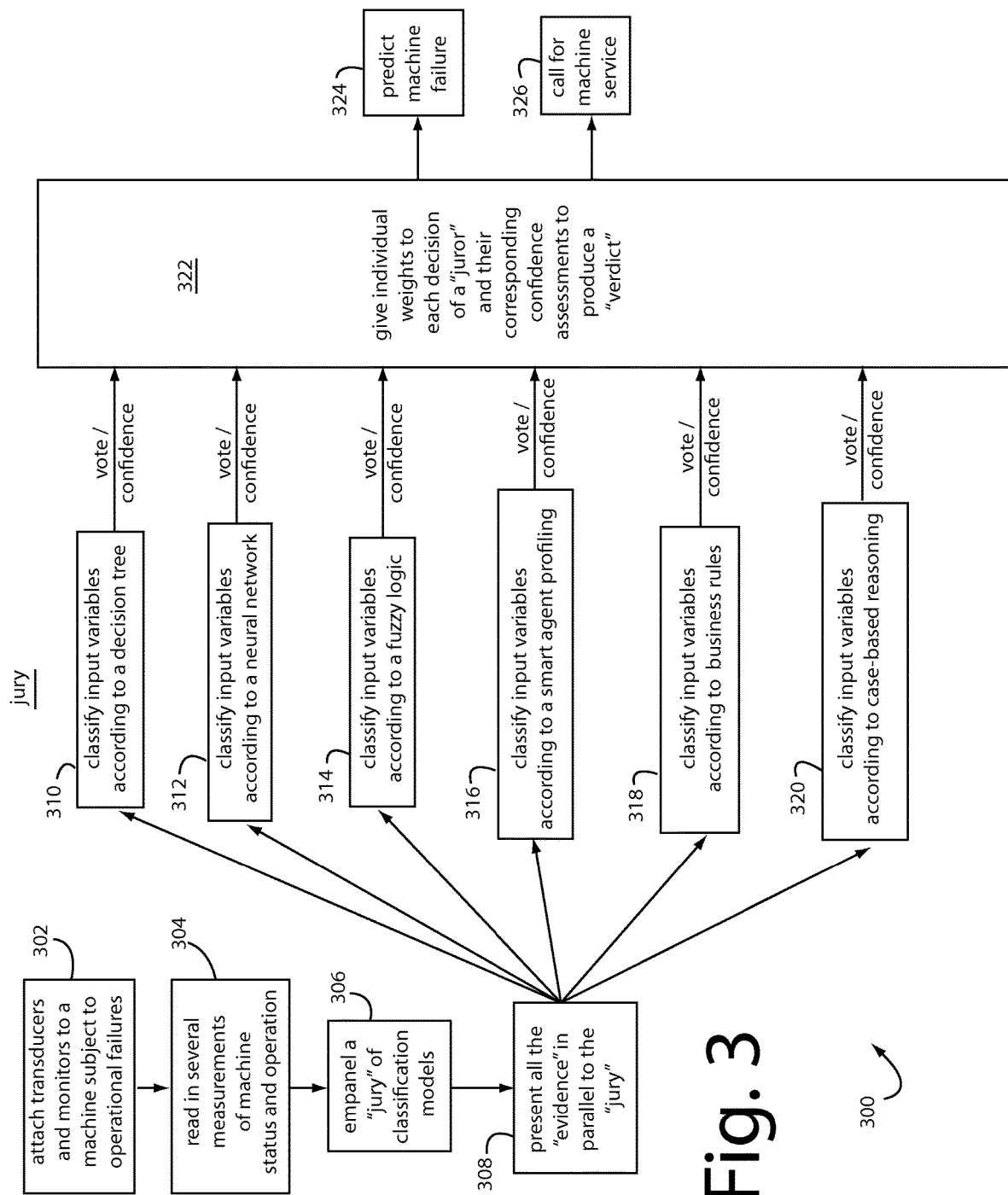
FIG. 3 is a flowchart diagram illustrating a method embodiment of the present invention for monitoring the operation of machines and for issuing calls for preventative maintenance and predictions of equipment failures.

FIG. 3 represents a method embodiment of the present invention for monitoring the operation of machines and for issuing calls for preventative maintenance and predictions of equipment failures, and is referred to herein by the general reference numeral 300. A step 302 attaches monitoring devices, instruments, and transducers to a machine subject to operational failures. A step 304 reads in the measurements and data obtained by the monitoring devices, instruments, and transducers regarding the status and operation of the machine. A step 306 empanels a "jury" of classification models as "jurors" to assess the measurements and data obtained. A step 308 presents all the measurements and data obtained to the empaneled jury for each juror's consideration.

A step 310 classifies the measurements and data obtained and presented to the jury according to a logic decision tree and outputting a juror vote that includes a confidence assessment.

A step 312 classifies the measurements and data obtained and presented to the jury according to a neural network and outputting another juror vote that includes a confidence assessment.

A step 314 classifies the measurements and data obtained and presented to the jury according to a fuzzy logic and outputting another juror vote that includes a confidence assessment.

A step 316 classifies the measurements and data obtained and presented to the jury according to a smart agent profiling and outputting another juror vote that includes a confidence assessment. Such profiling includes short-term, long-term, and recursive profiling.

A step 318 classifies the measurements and data obtained and presented to the jury according to business rules and outputting another juror vote that includes a confidence assessment. "Business Rules" here can include actual business enterprise policies and distilled service expertise.

A step 320 classifies the measurements and data obtained and presented to the jury according to case-based reasoning and outputting another juror vote that includes a confidence assessment. A "case" here could be a previous situation in which a high coolant temperature caused a deterioration of the lubricants in an engine, for example.

A step 322 collects together all the juror votes into a single "ballot" and mathematically applies individual weights in calculations to each respective juror vote with respect to its own confidence assessment and an a priori data input 323. The a priori data inputs 323 represent how confident a "judge" is in each juror. In a courtroom jury, judges are not allowed to separate the votes in a jury ballot and verdict. Nor can they use their wisdom, experience, and training to give weight or even dismiss a juror's individual vote. In method 300 the "judge" embodied in step 322 can do all of that and more.

Step 322 includes tallying a verdict from the results obtained in the previous steps, and that predicts an operational failure of the machine in a report it issues to service personnel and management.

Step 322 further includes tallying another verdict from the results obtained in the previous steps. A summons for service personnel to do a particular service procedure and/or a replacement part for the machine is made by outputting another report.

In summary, method 300 reduces the costs of maintaining machines.

In alternative embodiments of method 300 a step can be included that classifies the measurements and data obtained and presented to the jury according to an associative-learning juror included within the jury, and that calculates its decisions on the basis of associations between responses observed at its inputs to any particular stimulus it has previously learned, and outputting another juror vote that includes a confidence assessment.

In alternative embodiments of method 300 a step can be included that classifies the measurements and data obtained and presented to the jury according to clustering logic included within the jury panel, and that calculates its output decisions on the basis of clusters observed in the input data, and outputting another juror vote that includes a confidence assessment.

In alternative embodiments of method 300 a step can be included that classifies the measurements and data obtained and presented to the jury according to an optimization logic included within the jury panel, and that calculates its output decisions on the basis which combinations of values then at its inputs are constrained as allowable and which combinations are not, and outputting another juror vote that includes a confidence assessment.

In alternative embodiments of method 300 a step can be included that classifies the measurements and data obtained and presented to the jury according to a text mining logic included within the jury panel, and that bases its output decisions on an automated process of extracting information from analyses of unstructured texts at its inputs, and outputting another juror vote that includes a confidence assessment.

In alternative embodiments of method 300 a step can be included that "cleans" the data between a machine monitoring device and the jury panel, and including data-correction, data-deletion, and data-formatting to produce a single-format data structure at its output.

In alternative embodiments of method 300 a step can be included that enriches the data between a machine monitoring device and the jury panel, and including data-insertion, data-computation, and data-formatting logic in combination to produce an enriched single-format data structure at its output.

Figure 4:
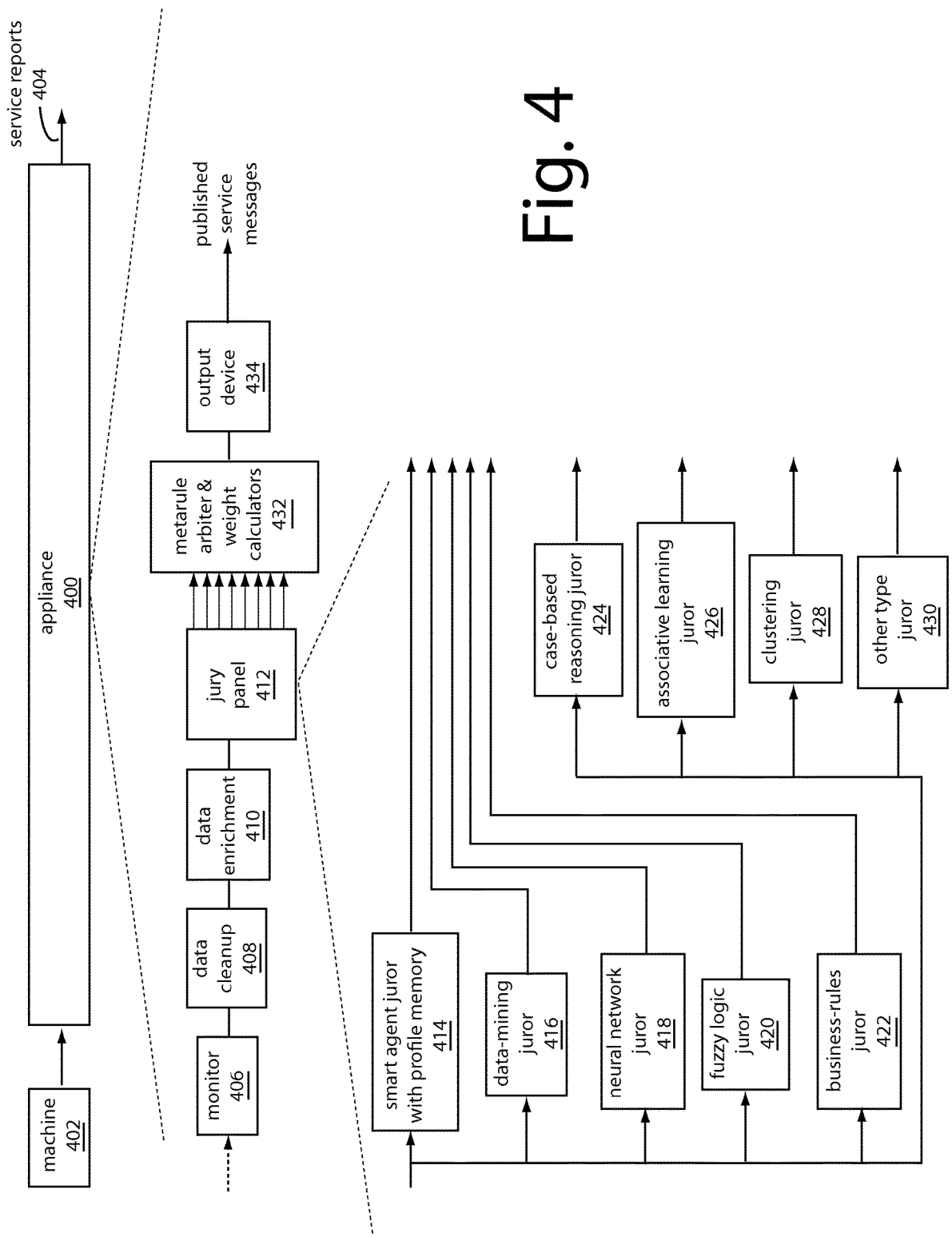
FIG. 4 is a functional block diagram of a digital electronic application specific integrated circuit (ASIC) embodiment of the present invention.

FIG. 4 illustrates an electronic appliance 400 for monitoring the operation of a machine 402 and for issuing calls for preventative maintenance and warnings of equipment failures in service reports 404. A monitoring device 406 receives electrical signals from transducers, pickups, and meters mounted to machine 402. These continuously measure (in parallel) a variety of operational parameters of the machine. The measurements are each electrically represented by voltages, currents, and/or digital data so the information can be accepted and used by combinational digital logic. A data cleanup device 408 removes noise, extraneous information, and unverified data. It further normalizes the data into standard formats and data structures. A data enrichment device 410 adds attributes to the data that can be interpreted, extrapolated, or calculated from the normalized data.

A jury panel 412 represents a digital logic assembly of several juror modules with electrical input connections that each receive the same cleaned-up, enriched operational parameter measurements of machine 802 at the same time, and each independently deliberate in solitude on an independent juror vote. Each juror makes its decisions in a different way and communicates as a juror-vote in a digital output.

A smart-agent juror module 414 is included within the jury panel 412 and includes a real-time profiling logic and storage memory, a long-term profiling logic and storage memory, and a recursive profiling logic and storage memory, in parallel between its inputs and outputs.

A data-mining juror module 416 is included within the jury panel 412 and includes a logic decision tree between its inputs and its outputs.

A neural-network juror module 418 is included within jury panel 412 and includes neural network logic between its inputs and its outputs.

A fuzzy logic juror module 420 is included within jury panel 412 and includes fuzzy logic between its inputs and its outputs to automatically cluster information into a plurality of risk categories and decreases sensitivity to noisy or outlier data.

A business-rules juror module 422 is included within jury panel 412 and includes business rules logic between its inputs and its outputs.

A case-based reasoning juror module 424 is included within jury panel 412 and includes representations of previous case sets of operational parameters of similar machines and past decisions determined to be successful ones, and a comparator to match these previous cases to a current set of operational parameters of the machine provided at its inputs, and an output for its conclusions.

An associative-learning juror module 426 is included within jury panel 412 and calculates its output decisions on the basis of associations between responses observed at its inputs to any particular stimulus it has previously learned.

A clustering juror module 428 is included within jury panel 412 and includes clustering logic between its inputs and its outputs.

Other types of classification model jurors 430 can be added to the jury panel 412 to add their unique perspectives to a diverse jury panel.

A metarule arbiter module 432 includes several weight calculators that each respectively receive a corresponding one of the independent juror-vote digital outputs. Such further includes a digital summation device that tallies a single composite prediction output.

An output device 434 transforms the composite prediction output into a human-readable form.

The other types of classification model jurors 430 mentioned can include an optimization-suite juror module included with the jury panel, and that includes optimization logic that specifies which combinations of values then at its inputs are constrained as allowable and which combinations are not, and that produces its decision at its outputs as digital data.

The other types of classification model jurors 430 mentioned can include a text mining juror module is included within jury panel 412 and includes text mining logic between its inputs and its outputs as digital data.

The other types of classification model jurors 430 mentioned can include a data cleaning device connected between the machine monitoring device and the jury panel, and that includes data-correction, data-deletion, and data-formatting logic that combine to produce a single-format data structure at its output.

The other types of classification model jurors 430 mentioned can include genetic algorithm component logic.

The other types of classification model jurors 430 mentioned can include phonetic algorithm component logic. and The other types of classification model jurors 430 mentioned can include field machine algorithm component logic.

The data enrichment device 410 connected between the machine monitoring device 406 and the jury panel 412 further can include includes data-insertion, data-computation, and data-formatting logic in combination to produce an enriched single-format data structure at its output.

The other types of classification model jurors 430 mentioned can include a velocity-analyzer juror module is included within jury panel 412 and includes velocity analyzing and data compression logic between its inputs and its outputs.

The other types of classification model jurors 430 mentioned can include an optimization suite juror module is included within jury panel 412 and includes optimization logic that specifies which combinations of values then at its inputs are constrained as allowable and which combinations are not, and that produces its decision at its outputs.

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. A method for monitoring the operation of machines and for issuing calls for preventative maintenance and predictions of equipment failures, comprising:
   attaching monitoring devices, instruments, and transducers to a machine subject to operational failures;
   reading in measurements and data obtained by the monitoring devices, instruments, and transducers regarding the status and operation of the machine;
   empaneling a jury of classification models as jurors to assess the measurements and data obtained with a separate computer programmed for that purpose;
   presenting all the measurements and data obtained to the jury with a separate computer programmed for that purpose;
   classifying the measurements and data obtained and presented to the jury according to a logic decision tree and outputting a juror vote that includes a confidence assessment with a separate computer programmed for that purpose;
   classifying the measurements and data obtained and presented to the jury according to a neural network and outputting another juror vote that includes a confidence assessment with a separate computer programmed for that purpose;
   classifying the measurements and data obtained and presented to the jury according to a fuzzy logic and outputting another juror vote that includes a confidence assessment with a separate computer programmed for that purpose;
   classifying the measurements and data obtained and presented to the jury according to a smart agent profiling and outputting another juror vote that includes a confidence assessment with a separate computer programmed for that purpose;
   classifying the measurements and data obtained and presented to the jury according to business rules and outputting another juror vote that includes a confidence assessment with a separate computer programmed for that purpose;
   classifying the measurements and data obtained and presented to the jury according to case-based reasoning and outputting another juror vote that includes a confidence assessment with a separate computer programmed for that purpose;
   collecting all the juror votes into a single ballot and mathematically apply individual weights in calculations to each respective juror vote with respect to its own confidence assessment and a priori data inputs with a separate computer programmed for that purpose;
   tallying a verdict from the results obtained in the previous steps, and that predicts an operational failure of the machine by outputting a report with a separate computer programmed for that purpose; and
   tallying another verdict from the results obtained in the previous steps, and that summons a particular service procedure and/or a replacement part for the machine by outputting another report so the costs of maintaining the machine are reduced.

2. The method of claim 1, further comprising: classifying the measurements and data obtained and presented to the jury according to an associative-learning juror included within the jury, and that calculates its decisions on the basis of associations between responses observed at its inputs to any particular stimulus it has previously learned, and outputting another juror vote that includes a confidence assessment.

3. The method of claim 1, further comprising:
classifying the measurements and data obtained and presented to the jury according to clustering logic included within the jury panel, and that calculates its output decisions on the basis of clusters observed in the input data, and outputting another juror vote that includes a confidence assessment.

4. The method of claim 1, further comprising:
classifying the measurements and data obtained and presented to the jury according to an optimization logic included within the jury panel, and that calculates its output decisions on the basis which combinations of values then at its inputs are constrained as allowable and which combinations are not, and outputting another juror vote that includes a confidence assessment.

5. The method of claim 1, further comprising:
classifying with a separate computer programmed for that purpose the measurements and data obtained and presented to the jury according to a text mining logic included within the jury panel, and that bases its output decisions on an automated process of extracting information from analyses of unstructured texts at its inputs, and outputting another juror vote that includes a confidence assessment.

6. The method of claim 1, further comprising:
data cleaning between a machine monitoring device and the jury panel, and including data-correction, data-deletion, and data-formatting to produce a single-format data structure at its output.

7. The method of claim 1, further comprising: data enriching between a machine monitoring device and the jury panel, and including data-insertion, data-computation, and data-formatting logic in combination to produce an enriched single-format data structure at its output.

8. A group of electronic appliances for monitoring the operation of machines and for issuing calls for preventative maintenance and predictions of equipment failures, comprising:
a monitoring device attached by instruments to a machine and having electrical inputs and transducers that measure in parallel a variety of operational parameters of the machine and that are then electrically represented by voltages, currents, and/or digital data;
a jury panel comprising a digital logic assembly of several juror modules with electrical input connections that each receive the same operational parameter measurements of the machine at the same time, and that each produce an independent juror vote decided in a different way and communicated as a juror-vote digital output;
a smart-agent juror module included with the jury panel and that includes a real-time profiling logic and storage memory, a long-term profiling logic and storage memory, and a recursive profiling logic and storage memory, in parallel between its inputs and outputs;
a data-mining juror module included with the jury panel and that includes a logic decision tree between its inputs and its outputs; a neural-network juror module included with the jury panel and that includes neural network logic between its inputs and its outputs;
a fuzzy logic juror module included with the jury panel and that includes fuzzy logic between its inputs and its outputs to automatically cluster information into a plurality of risk categories and decreases sensitivity to noisy or outlier data;
a business-rules juror module included with the jury panel and that includes business rules logic between its inputs and its outputs;
a case-based reasoning juror module included with the jury panel and that includes representations of previous case sets of operational parameters of similar machines and past decisions determined to be successful ones, and a comparator to match these previous cases to a current set of operational parameters of the machine provided at its inputs, and an output for its conclusions;
an associative-learning juror module included with the jury panel, and that calculates its output decisions on the basis of associations between responses observed at its inputs to any particular stimulus it has previously learned;
a clustering juror module included with the jury panel and that includes clustering logic between its inputs and its outputs;
a metarule arbiter module comprising several weight calculators each respectively attached to receive a corresponding one of said independent juror-vote digital outputs, and a digital summation device that produces a single composite prediction output from a set of several weighted sums of said dependent juror vote digital outputs; and
an output device that transforms the composite prediction output into human-readable form.

9. The group of electronic appliances of claim 8, further comprises:
an optimization-suite juror module included with the jury panel, and that includes optimization logic that specifies which combinations of values then at its inputs are constrained as allowable and which combinations are not, and that produces its decision at its outputs as digital data.

10. The group of electronic appliances of claim 8, further comprises:
a text mining juror module included with the jury panel and that includes text mining logic between its inputs and its outputs as digital data.

11. The group of electronic appliances of claim 8, further comprises:
a data cleaning device connected between the machine monitoring device and the jury panel, and that includes data-correction, data-deletion, and data-formatting logic that combine to produce a single-format data structure at its output.

12. The group of electronic appliances of claim 8, further comprises:
a data enrichment device connected between the machine monitoring device and the jury panel, and that includes data-insertion, data-computation, and data-formatting logic in combination to produce an enriched single-format data structure at its output.

13. The group of electronic appliances of claim 8, further comprises:
a velocity-analyzer juror module included with the jury panel and that includes velocity analyzing and data compression logic between its inputs and its outputs.

14. The group of electronic appliances of claim 8, further comprises:

an optimization suite juror module included with the jury panel and that includes optimization logic that specifies which combinations of values then at its inputs are constrained as allowable and which combinations are not, and that produces its decision at its outputs.

15. The method of claim 1, carried out by a semiconductor device.

16. The group of electronic appliances of claim 8, comprising a semiconductor device.

\* \* \* \* \*